(12) United States Patent  
Qin

(10) Patent No.: US 11,200,294 B2
(45) Date of Patent: Dec. 14, 2021

(54) PAGE UPDATING METHOD AND DISPLAY DEVICE

(71) Applicant: HISENSE VISUAL TECHNOLOGY CO., LTD., Shandong (CN)

(72) Inventor: Jingbo Qin, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/890,236

(22) Filed: Jun. 2, 2020

(65) Prior Publication Data

US 2020/0301992 A1    Sep. 24, 2020

Related U.S. Application Data

(63) Continuation of application No. PCT/CN2020/078678, filed on Mar. 10, 2020.

(30) Foreign Application Priority Data

Mar. 20, 2019  (CN) .......................... 201910211997.8
Mar. 20, 2019  (CN) .......................... 201910214794.4

(51) Int. Cl.
*G06Q 30/06* (2012.01)
*G06F 16/957* (2019.01)
(Continued)

(52) U.S. Cl.
CPC ...... *G06F 16/9577* (2019.01); *G06F 16/9566* (2019.01); *G06F 16/986* (2019.01)

(58) Field of Classification Search
CPC . G06F 16/9577; G06F 16/9566; G06F 16/986
(Continued)

(56) References Cited

U.S. PATENT DOCUMENTS 5,210,849 A * 5/1993 Takahashi ........... G06F 12/0859
                                                 711/144
6,122,647 A * 9/2000 Horowitz .............. G06F 16/954
                                                 715/205

(Continued)

FOREIGN PATENT DOCUMENTS

CN       101505385 A      8/2009
CN       101543073 A      9/2009
(Continued)

OTHER PUBLICATIONS

International Search Report and English translation regarding PCT/CN2020/078678 dated May 27, 2020, 9 pages.
(Continued)

*Primary Examiner* — Hassan Mrabi
(74) *Attorney, Agent, or Firm* — Crowell & Moring LLP

(57) ABSTRACT

The present disclosure describes page updating methods and display devices. The method includes displaying, by a display device in a shopping mall mode, a first presentation page as an overlay on a user interface of the display device. The first presentation page comprises a first presentation file, and the first presentation file corresponds to a first URL. The method includes sending, by the display device, an update message associated with a web page presentation to a web application on the display device; generating, by the display device, a second URL based on the first URL and the update message, the update message indicating that the first presentation file is updated to a second presentation file; obtaining, by the display device, the second presentation file according to the second URL; and updating, by the display device, the first presentation page to a second presentation page based on the second presentation file.

14 Claims, 9 Drawing Sheets

(51) Int. Cl.
*G06F 16/955* (2019.01)
*G06F 16/958* (2019.01)

(58) Field of Classification Search
USPC .......................................................... 715/234
See application file for complete search history.

(56) References Cited

U.S. PATENT DOCUMENTS

| | | | |
|---|---|---|---|
| 6,593,946 B1 | 7/2003 | Yoda | |
| 7,426,687 B1* | 9/2008 | Schultz | G06F 16/9566 715/208 |
| 8,296,392 B2* | 10/2012 | Green | G06F 16/958 709/217 |
| 8,578,416 B1 | 11/2013 | Radloff et al. | |
| 9,396,476 B2* | 7/2016 | Walker | G06F 16/986 |
| 9,489,352 B1* | 11/2016 | Agostino | G06F 16/954 |
| 9,690,763 B1* | 6/2017 | Lee | G06F 16/954 |
| 9,720,889 B1* | 8/2017 | Kobyakov | G06Q 30/0275 |
| 9,767,212 B2* | 9/2017 | Lavi | G06F 16/9577 |
| 9,830,376 B2* | 11/2017 | Burgmeier | G06F 16/93 |
| 9,887,941 B1* | 2/2018 | Guarraci | H04L 51/046 |
| 9,912,718 B1* | 3/2018 | Lepeska | H04L 67/02 |
| 9,996,535 B1* | 6/2018 | Skidmore | G06F 16/93 |
| 10,042,826 B2* | 8/2018 | Spyropoulos | G06F 3/04812 |
| 10,133,824 B2* | 11/2018 | Divringi | G06Q 30/02 |
| 10,439,965 B1* | 10/2019 | Guarraci | G06Q 30/02 |
| 10,467,615 B1* | 11/2019 | Omojola | G06Q 30/0637 |
| 10,585,965 B2* | 3/2020 | Ochiai | G06F 16/958 |
| 2004/0068527 A1* | 4/2004 | Smith, III | G06F 16/748 |
| 2004/0205076 A1* | 10/2004 | Huang | G06F 16/951 |
| 2005/0010475 A1* | 1/2005 | Perkowski | G07F 17/16 705/14.51 |
| 2005/0198300 A1* | 9/2005 | Gong | G06F 16/9577 709/227 |
| 2006/0015925 A1* | 1/2006 | Logan | H04N 7/163 725/135 |
| 2007/0094365 A1* | 4/2007 | Nussey | G06F 16/986 709/223 |
| 2008/0077653 A1* | 3/2008 | Morris | G06F 16/986 709/203 |
| 2008/0109863 A1 | 5/2008 | Ying | |
| 2008/0134018 A1* | 6/2008 | Kembel | H04L 67/306 715/234 |
| 2008/0139191 A1* | 6/2008 | Melnyk | G06F 16/9577 455/419 |
| 2008/0148192 A1* | 6/2008 | Read | G06F 16/9577 715/854 |
| 2009/0172565 A1* | 7/2009 | Jackson | H04L 65/403 715/753 |
| 2009/0271873 A1* | 10/2009 | Ram | H04L 12/1822 726/29 |
| 2010/0005424 A1* | 1/2010 | Sundaresan | G06F 3/04815 715/849 |
| 2010/0153544 A1* | 6/2010 | Krassner | G06F 40/14 709/224 |
| 2011/0167492 A1* | 7/2011 | Ghosh | H04L 63/1408 726/23 |
| 2011/0238524 A1* | 9/2011 | Green | G06Q 30/0601 705/26.7 |
| 2012/0036507 A1* | 2/2012 | Jonnala | G06F 8/60 717/178 |
| 2012/0066075 A1 | 3/2012 | Hyun | |
| 2012/0109945 A1* | 5/2012 | Lapko | G06F 16/9577 707/723 |
| 2013/0055289 A1* | 2/2013 | Maltese | G06F 9/545 719/320 |
| 2013/0073401 A1* | 3/2013 | Cook | G06F 12/0802 705/14.73 |
| 2013/0317808 A1* | 11/2013 | Kruel | H04L 51/32 704/9 |
| 2014/0059034 A1* | 2/2014 | Wang | G06F 16/954 707/710 |
| 2014/0081789 A1* | 3/2014 | Rollins | H04L 67/22 705/26.1 |
| 2014/0108941 A1* | 4/2014 | Joel | G06T 3/40 715/738 |
| 2014/0129920 A1* | 5/2014 | Sheretov | H04L 63/20 715/234 |
| 2014/0240101 A1* | 8/2014 | Uno | G06F 16/9562 340/10.51 |
| 2014/0280479 A1* | 9/2014 | Kazerani | H04L 65/602 709/203 |
| 2014/0280480 A1* | 9/2014 | Kazerani | H04L 67/2823 709/203 |
| 2014/0304588 A1* | 10/2014 | Li | G06F 16/9577 715/234 |
| 2015/0121223 A1* | 4/2015 | Wellen | H04N 21/435 715/719 |
| 2015/0154635 A1* | 6/2015 | Randall | G06Q 30/0267 705/14.53 |
| 2015/0186542 A1* | 7/2015 | Singh | G06F 16/9566 715/206 |
| 2015/0341225 A1* | 11/2015 | Baarman | G06Q 30/0201 705/333 |
| 2015/0356259 A1* | 12/2015 | Park | G06Q 40/08 705/2 |
| 2016/0004676 A1* | 1/2016 | Goto | H04L 67/02 715/234 |
| 2016/0110454 A1* | 4/2016 | McKenzie | G06F 16/211 707/711 |
| 2016/0147718 A1* | 5/2016 | Spyropoulos | G06F 3/04812 715/205 |
| 2016/0162596 A1* | 6/2016 | Reyes | G06F 16/951 707/706 |
| 2016/0232538 A1* | 8/2016 | Papakostas | G06F 16/48 |
| 2016/0234330 A1* | 8/2016 | Popowitz | H04L 67/2814 |
| 2016/0255139 A1* | 9/2016 | Rathod | H04L 51/046 709/203 |
| 2016/0328746 A1* | 11/2016 | Walker | G06Q 30/0277 |
| 2017/0131856 A1* | 5/2017 | Reyes | G06F 21/31 |
| 2017/0302747 A1* | 10/2017 | Luo | G06F 9/445 |
| 2017/0345057 A1* | 11/2017 | Baker, III | G06Q 10/00 |
| 2018/0007171 A1* | 1/2018 | Franco | G06F 9/54 |
| 2018/0091546 A1* | 3/2018 | Davidson | G06F 40/14 |
| 2018/0107758 A1* | 4/2018 | Ha | G06F 16/9577 |
| 2018/0196643 A1* | 7/2018 | Dolby | G06F 8/10 |
| 2018/0239826 A1* | 8/2018 | Epstein | G06F 16/951 |
| 2018/0246983 A1* | 8/2018 | Rathod | G06F 16/9535 |
| 2019/0197193 A1* | 6/2019 | Williams | G06F 16/955 |
| 2019/0278823 A1* | 9/2019 | Arakawa | G06F 16/9566 |
| 2019/0325073 A1* | 10/2019 | Goodman | G06F 16/9577 |
| 2020/0106850 A1* | 4/2020 | Popowitz | H04L 67/2823 |
| 2020/0193252 A1* | 6/2020 | Guinard | G06Q 10/087 |

FOREIGN PATENT DOCUMENTS

| | | |
|---|---|---|
| CN | 102496339 A | 6/2012 |
| CN | 102577361 A | 7/2012 |
| CN | 102833635 A | 12/2012 |
| CN | 103348710 A | 10/2013 |
| CN | 104182548 A | 12/2014 |
| CN | 104516973 A | 4/2015 |
| CN | 106874328 A | 6/2017 |
| CN | 109857972 A | 6/2019 |
| CN | 109862413 A | 6/2019 |

OTHER PUBLICATIONS

Chinese Office Action with English translation regarding 201910214794.4 dated Nov. 23, 2020.

* cited by examiner

PAGE UPDATING METHOD AND DISPLAY DEVICE

This application is a continuation of International Application No. PCT/CN2020/078678, filed on Mar. 10, 2020, which claims priority of Chinese Patent Application No. 201910211997.8, filed Mar. 20, 2019, titled "Page updating method and display device", and Chinese Patent Application No. 201910214794.4, filed on Mar. 20, 2019, titled "Method for displaying device information in display image and display device", all of which are hereby incorporated by reference in their entireties.

FIELD

The present disclosure relates to the technical field of display, and in particular, to a page updating method and a display device.

BACKGROUND

Currently, display devices mostly use a Hyper Text Markup Language (HTML) technology to implement page display to support multiple functions.

For example, a display device in a shopping mall may display images on its display, and the images contain information such as the model, price, and advantageous functions of the display device, or contain information such as the name, logo and discounts of the shopping mall.

SUMMARY

The present disclosure describes a method for updating a page. The method includes displaying, by a display device in a shopping mall mode, a first presentation page as an overlay on a user interface of the display device. The display device includes a memory storing instructions and a processor in communication with the memory. The first presentation page comprises a first presentation file, and the first presentation file corresponds to a first URL. The method includes sending, by the display device, an update message associated with a web page presentation to a web application on the display device; generating, by the display device, a second URL based on the first URL and the update message, the update message indicating that the first presentation file is updated to a second presentation file; obtaining, by the display device, the second presentation file according to the second URL; and updating, by the display device, the first presentation page to a second presentation page based on the second presentation file.

The present disclosure describes a display device. The display device includes a display configured to display an image; a memory configured to store programs and data associated with the display; and a controller in communication with the display and the memory. When the controller executes the programs stored in the memory, the controller is configure to cause the display device to perform, in a shopping mall mode of the display device, displaying a first presentation page as an overlay on a user interface of the display device by a web application on the display device. The first presentation page comprises a first presentation file, and the first presentation file corresponds to a first URL. When the controller executes the programs stored in the memory, the controller is configure to cause the display device to perform sending an update message associated with a web page presentation to the web application, generating a second URL based on the first URL and the update message, the update message indicating that the first presentation file is updated to a second presentation file, obtaining the second presentation file according to the second URL, and updating the first presentation page to a second presentation page based on the second presentation file.

BRIEF DESCRIPTION OF THE DRAWINGS

In order to explain the embodiments of the present disclosure more clearly, the drawings required in embodiment description will be briefly introduced below. Obviously, the drawings in the following description are only some embodiments of the present disclosure. Those skilled in the art can further obtain other drawings according to the drawings without paying inventive work.

DETAILED DESCRIPTION OF THE EMBODIMENTS

In order to make the objectives, technical schemes, and advantages of the present disclosure more clearly, the present disclosure will be described in further detail below with reference to the drawings. Obviously, the described embodiments are only part rather than all of the embodiments of the present disclosure. Based on the embodiments of the present disclosure, all other embodiments obtained by those skilled in the art without creative labor shall fall within the protection scope of the present disclosure.

At present, because the model and price of a display device will change with different shopping malls and different promotions, it is necessary for users to regularly update images containing information such as the model, price and advantageous function, or images containing information such as the shopping mall name, logo and discounts, as displayed on the display devices sold in shopping malls.

However, when the above users store the updated image in a local disk, they often need to exit a browser and restart the browser so that the updated image can be displayed on a web page, which causes the operation process inconvenient and user experience undesirable.

Therefore, an embodiment of the present disclosure provides a display method and a display device for allowing updating a displayed file in real time while the display device is displaying the page.

The display device in the embodiments is briefly described below.

Figure 1A:
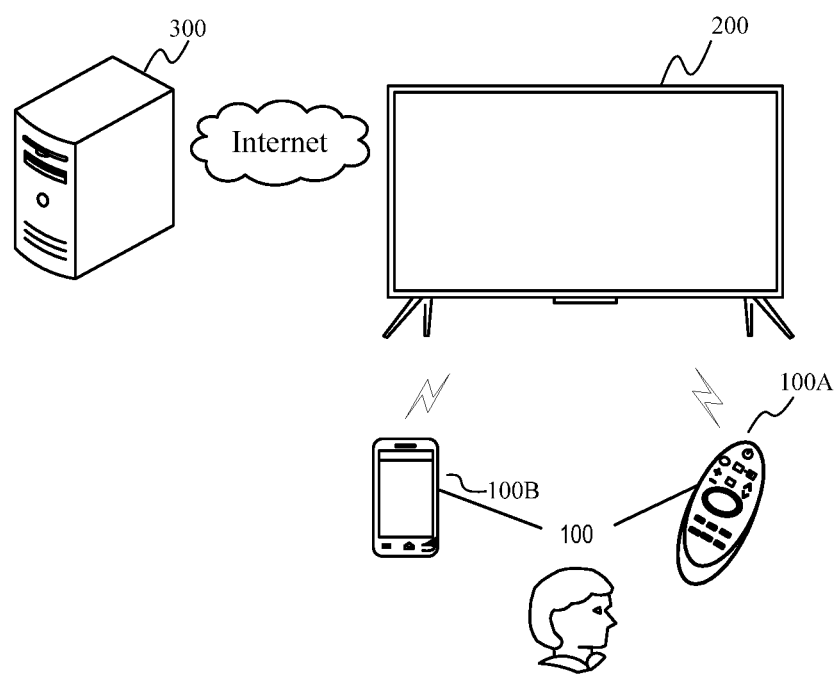
FIG. 1A illustrates a schematic diagram of an operation scenario between a display device and a control device.

FIG. 1A illustrates a schematic diagram of an operation scenario between a display device and a control device. As shown in FIG. 1A, the control device 100 and the display device 200 can communicate with each other in a wired or wireless manner.

Wherein, the control device 100 is configured to control the display device 200. The control device 100 can receive an operation instruction input from a user, convert the operation instruction into an instruction that the display device 200 can recognize and respond to, and play an interconnection role between the user and the display device 200. For example, the user operates a channel up or channel-down button on the control device 100, and the display device 200 responds to the channel up or channel down operation.

The control device 100 may be a remote controller 100A, controlling the display device 200 in wireless or other wired manners according to infrared protocol communication or Bluetooth protocol communication, and other short-range communication methods. The user can control the display device 200 by inputting user instructions through buttons on the remote controller, voice input or control panel input. For example, the user can control the display device 200 by inputting corresponding control instructions through the volume up/volume down buttons, channel control buttons, up/down/left/right navigation buttons, voice input buttons, menu buttons or power on/off buttons on the remote controller.

The control device 100 may also be a smart device such as a mobile terminal 100B, a tablet computer, a computer or a notebook computer. For example, the display device 200 is controlled by using an application program running on the smart device. The application program is configured to provide a user with various controls through a visualized user interface (UI) on a screen associated with the smart device.

In an example, a software application can be installed in a mobile terminal 100B and the display device 200 to implement connection communication through a network communication protocol and achieve one-to-one control operation and data communication. For example, the mobile terminal 100B and the display device 200 can be configured to establish a control instruction protocol to allow for realising functions of physical buttons arranged on the remote controller 100A by operating various function buttons or virtual buttons of the user interface provided on the mobile terminal 100B. An audio and video content displayed on the mobile terminal 100B may also be transmitted to the display device 200 to implement a synchronous display function.

The display device 200 may provide a network television function with a broadcast receiving function and a computer support function. The display device may be implemented as a digital television, an Internet television, or an internet protocol television (IPTV).

The display device 200 may be a liquid crystal display, an organic light emitting display, or a projection device. The specific type, size and resolution of the display device are not limited.

The display device 200 further performs data communication with a server 300 through various communication methods. The display device 200 may be allowed to perform communication connection through a local area network (LAN), a wireless local area network (WLAN), and other networks here. The server 300 may provide various contents and interactions for the display device 200. For example, the display device 200 may send and receive information, such as: receiving electronic program guide (EPG) data, receiving software program update, or accessing a remotely stored digital media library. The server 300 may be one group of servers or a plurality of groups of servers, and may be one or more types of servers. The server 300 provides other network service contents such as video on demand and advertising services.

Figure 1B:
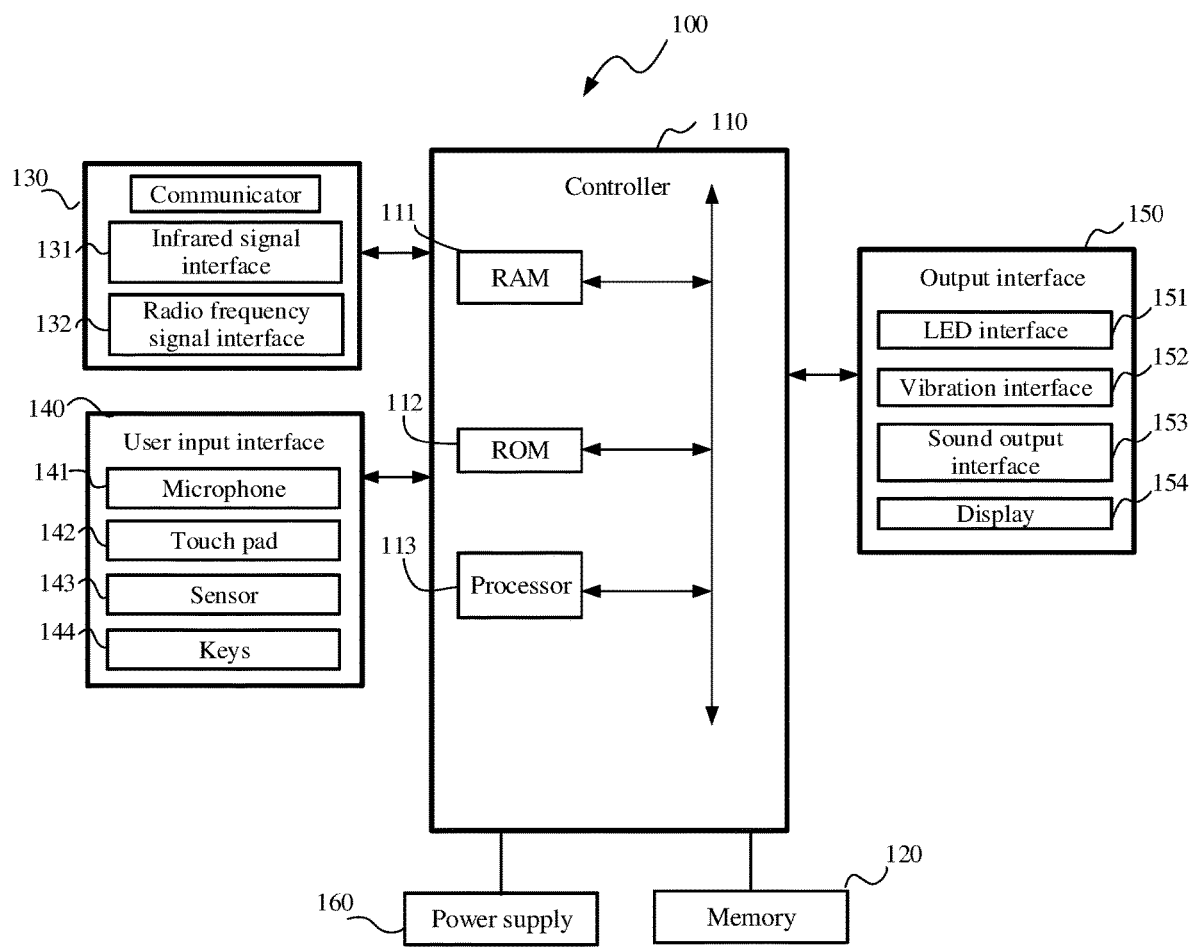
FIG. 1B illustrates a configuration block diagram of the control device 100 in FIG. 1A.

FIG. 1B illustrates a configuration block diagram of the control device 100. As shown in FIG. 1B, the control device 100 includes a controller 110, a memory 120, a communicator 130, a user input interface 140, an output interface 150, and a power supply 160.

The controller 110 includes a random access memory (RAM) 111, a read-only memory (ROM) 112, a processor 113, a communication interface, and a communication bus. The controller 110 is configured to control the running and operation of the control device 100, as well as the communication cooperation between all internal components, and external and internal data processing functions.

In an example, when an interaction in which a user presses a key on the remote controller 100A or an interaction in which the user touches a touch panel on the remote controller 100A is detected, the controller 110 may control to generate a signal corresponding to the detected interaction, and the signal is sent to the display device 200.

The memory 120 is configured to store various running programs, data, and applications that drive and control the control device 100 under the control of the controller 110. The memory 120 may store various control signal instructions input from a user.

The communicator 130 realizes communication of control signals and data signals with the display device 200 under the control of the controller 110. For example, the control device 100 sends the control signals (such as the touch signal or the button signal) to the display device 200 via the communicator 130, and the control device 100 can receive the signals sent from the display device 200 via the communicator 130. The communicator 130 may include an infrared signal interface 131 and a radio frequency signal interface 132. For example, in the case where the infrared signal interface is used, a user input instruction needs to be converted into an infrared control signal according to an infrared control protocol, and then the infrared control signal is sent to the display device 200 via an infrared sending module. For example, in the case where the radio frequency signal interface is used, the user input instruction needs to be converted into a digital signal, and then the digital signal is modulated according to a radio frequency control signal modulation protocol, and then sent to the display device 200 from a radio frequency sending terminal.

The user input interface 140 may include at least one of a microphone 141, a touchpad 142, a sensor 143 and a key 144 so that the user can input a user instruction associated with controlling of the display device 200 to the control device 100 through voice, touch, gesture and pressing.

The output interface 150 outputs the user instruction received from the user input interface 140 to the display device 200, or outputs an image or a voice signal received from the display device 200. Here, the output interface 150 may include an LED interface 151, a vibration interface 152 that generates vibration, a sound output interface 153 that outputs sound, and a display 154 that outputs an image. For example, the remote controller 100A may receive output signals such as audio, video, or data from the output interface 150, display the output signals as images on the display 154, and outputs the output signals as audio on the sound output interface 153, or outputs the output signals as vibration on the vibration interface 152.

The power supply 160 is configured to provide running power support for each component of the control device 100 under the control of the controller 110. The form may be a battery and related control circuits.

Figure 1C:
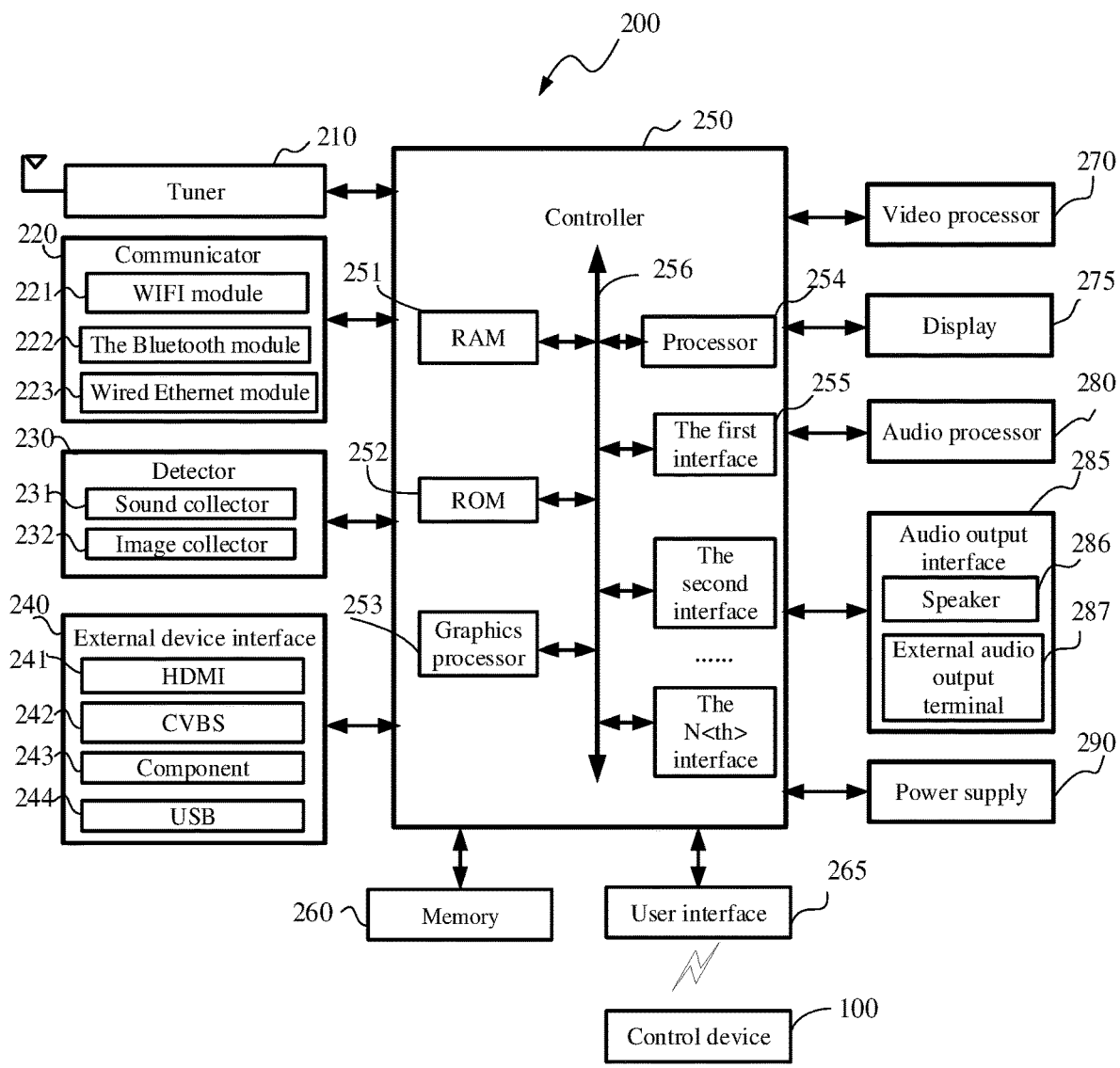
FIG. 1C illustrates a configuration block diagram of the display device 200 in FIG. 1A.

FIG. 1C illustrates a hardware configuration block diagram of the display device 200. As shown in FIG. 1C, the display device 200 may include a tuner 210, a communicator 220, a detector 230, an external device interface 240, a controller 250, a memory 260, a user interface 265, a video processor 270, a display 275, an audio processor 280, an audio output interface 285, and a power supply 290.

The tuner 210 is configured to receive television broadcast signals through a wired or wireless method, and can perform modulation and demodulation processing such as amplification, mixing, and resonance. It is configured to demodulate the audio and video signals carried in the frequency of a television channel selected by a user, as well as additional information (such as EPG data) from multiple wireless or cable television broadcast signals.

The tuner 210 is configured to respond to a frequency of the television channel selected by a user and the television signals carried by the frequency according to the user's selection and the control of the controller 250.

The tuner 210, depending on different broadcast systems of the television signals, can receive the signals in a variety of ways, such as: terrestrial broadcast, cable broadcast, satellite broadcast or Internet broadcast; and according to different modulation types, it can adopt a digital modulation mode or an analog modulation mode; and depending on the different types of TV signals, it can demodulate analog and digital signals.

In some other exemplary embodiments, the tuner 210 may also be provided in an external device, such as an external set-top box. In this way, the set-top box outputs the television signals after modulation and demodulation, and inputs the television signals to the display device 200 through the external device interface 240.

The communicator 220 is a component for communicating with an external device or an external server according to various communication protocols. For example, the display device 200 may transmit content data to the external device connected via the communicator 220, or browse and download the content data from the external device connected via the communicator 220. The communicator 220 may include network communication protocol modules such as a WIFI module 221, a Bluetooth communication protocol module 222, and a wired Ethernet communication protocol module 223, or a near field communication protocol module, so that the communicator 220 may receive control signals of the control device 100 according to the control of the controller 250, and implement the control signals as WIFI signals, Bluetooth signals, or radio frequency signals.

The detector 230 is a component used by the display device 200 to collect signals from the external environment or interacting with the outside. The detector 230 may include a sound collector 231, such as a microphone, which may be configured to receive a user's voice such as a voice signal of a control instruction from a user to control the display device 200, or may collect the environmental sound for identifying the type of an environmental scene so that the display device 200 can adapt to environmental noise.

In some other exemplary embodiments, the detector 230 may further include an image collector 232 such as a camera or a webcam, which may be configured to collect an external environment scene to self-adaptively change display parameters of the display device 200, and configured to collect attributes of a user or interaction gestures with the user to implement the function of interaction between the display device and the user.

In some other exemplary embodiments, the detector 230 may further include a light receiver for collecting environmental light intensity to change the display parameters of the display device 200 accordingly.

In some other exemplary embodiments, the detector 230 may further include a temperature sensor. For example, by sensing an environmental temperature, the display device 200 may adjust a display color temperature of an image accordingly. In an example, when in an environment with high temperature, the display device 200 may adjust the color temperature of the display image to be cooler; and when in an environment with low temperature, the display device 200 may adjust the color temperature of the display image to be warmer.

The external device interface 240 is a component for the controller 250 to control data transmission between the display device 200 and external devices. The external device interface 240 may be connected with the external devices such as a set-top box, a game device, a notebook computer in a wired/wireless manner, and can receive data such as video signals (such as moving images), audio signals (such as music) and additional information (such as EPG) from the external devices.

Wherein, the external device interface 240 may include any one or more of a high-definition multimedia interface (HDMI) terminal 241, a composite video blanking synchronization (CVBS) terminal 242, an analog or digital component terminal 243, a universal serial bus (USB) terminal 244, a component terminal (not shown in the figures) and a red-green-blue (RGB) terminal (not shown in the figures).

The controller 250 controls the work of the display device 200 and responds to user operations by running various software control programs (such as an operating system and various application programs) stored on the memory 260.

As shown in FIG. 1C, the controller 250 includes a random access memory (RAM) 251, a read-only memory (ROM) 252, a graphics processor 253, a CPU processor 254, a communication interface 255 and a communication bus 256, wherein the RAM251 and the ROM252 are connected with the graphics processor 253, the CPU processor 254 and the communication interface 255 through the communication bus 256.

ROM252 is configured to store various system boot programs. For example, when a power-on signal is received, the power of the display device 200 starts, the CPU processor 254 runs the system boot programs in the ROM252 and copies an operating system stored in the memory 260 into the RAM251 to start running and starting the operating system. After the operating system initiation is completed, the CPU processor 254 copies various application programs in the memory 260 into the RAM251 again, and then starts to run and start the various application programs.

The graphics processor 253 is configured to generate various graphic objects, such as icons, operation menus, and user input instructions for displaying graphics. The graphics processor 253 may include an arithmetic unit for performing operations by receiving various interactive instructions input from the user and then displaying various objects according to display attributes; and it includes a renderer for generating the various objects obtained based on the arithmetic unit and displaying the rendered results on the display 275.

The CPU processor 254 is configured to run the operating system and the application programs stored in the memory 260, and execute various applications, and data and content processing according to the received user input instructions so as to finally display and play various audio and video contents.

In some exemplary embodiments, the CPU processor 254 may include a plurality of processors. The plurality of processors may include a main processor and one or more sub-processor. The main processor is configured to perform some initialization operations of the display device 200 in a preloaded mode of the display device, and/or an operation of displaying a screen in a normal mode. The one or more sub-processor is configured to perform an operation in a state such as a standby mode of the display device.

The communication interface 255 may include a first interface to an Nth interface. The interfaces may be network interfaces connected to external devices via a network.

The controller 250 may control the overall operation of the display device 200. For example, in response to receiving a user input command for selecting a GUI object displayed on the display 275, the controller 250 may perform an operation related to the object selected by the user input command.

Wherein, the object can be any one of optional objects, such as a hyperlink or an icon. The operation related to the selected object is, for example, an operation to display a link to a hyperlinked page, a document, or an image, or an operation to execute a program corresponding to the object. The user input command for selecting the GUI object may be an input command of various input devices (for example, a mouse, a keyboard, a touch pad) connected to the display device 200 or a voice command corresponding to a voice sent from a user.

The memory 260 is configured to store various types of data, software programs, or application programs that drive and control the running of the display device 200. The memory 260 may include a volatile and/or non-volatile memory. The term "memory" includes the memory 260, the RAM251 and ROM252 of the controller 250, or a memory card in the display device 200.

In some embodiments, the memory 260 is specifically configured to store a running program that drives the controller 250 in the display device 200, store various application programs that are built into the display device 200 and that are downloaded by the user from an external device, and store data such as visual effect images for configuring various GUIs provided by the display 275, various objects related to the GUI, and a selector for selecting the GUI objects.

In some embodiments, the memory 260 is specifically configured to store drive programs and related data of the tuner 210, the communicator 220, the detector 230, the external device interface 240, the video processor 270, the display 275 and the audio processor 280, and external data (such as audio and video data) received from an external device interface or user data (such as key information, voice information or touch information) received from a user interface.

In some embodiments, the memory 260 specifically is configured to store software and/or programs associated with an operating system (OS), and the software and/or programs may include, for example, a kernel, middleware, an application programming interface (API), and/or application programs. In an example, the kernel can control or manage system resources and functions implemented by other programs (such as the middleware, API, or application programs); and meanwhile, the kernel can provide interfaces to allow the middleware, the API, or the application programs access the controller to control or manage the system resources.

For example, various software modules stored in the memory 260 may include: a basic module, a detection module, a communication module, a display control module, a browser module, and various service modules. Here, the basic module is a low-layer software module for performing signal processing on signals received from various hardware elements in the display device, and sending the processed signals to an upper-layer application module. The detection module is a management module for collecting various information from various detectors or user interfaces, and performing digital-to-analog conversion and analysis management on the collected information. The communication module is a module for carrying out controlling and data communication with an external device. The display control module is a module for controlling the display to display an image content, and is configured to play a multimedia image content and GUI interface information. The browser module is a module for accessing a web server by performing web browsing operation. The service module is a module for providing various services and various application programs.

The user interface 265 receives various user interactions. Specifically, it is configured to send an input signal from a user to the controller 250 or transmit an output signal from the controller 250 to the user. In an example, the remote controller 100A may send input signals such as a power switch signal, a channel selection signal, and a volume adjustment signal input from a user to the user interface 265, and then transfer the signals to the controller 250 via the user interface 265; or the remote controller 100A may receive output signals such as audio, video, or data output from the user interface 265 and processed by the controller 250, and display the received output signals or output the received output signals in the form of audio or vibration.

In some embodiments, a user may input a user command on a graphical user interface (GUI) displayed on the display 275, and the user interface 265 receives the user input command through the GUI. Specifically, the user interface 265 may receive the user input command for controlling the position of the selector in the GUI to select different objects or items.

Alternatively, the user can input a command by inputting a specific sound or gesture, and the user interface 265 recognizes the sound or the gesture through the sensor to receive the user input command. The video processor 270 is configured to receive external video signals, and perform video data processing such as decompression, decoding, scaling, noise reduction, frame rate conversion, resolution conversion and image synthesis according to a standard encoding and decoding protocol of the input signal, and can obtain a video signal displayed or played directly on the display 275.

For example, the video processor 270 includes a demultiplexing module, a video decoding module, an image synthesis module, a frame rate conversion module and a display format module.

Wherein the demultiplexing module is used for demultiplexing input audio and video data stream. For example, when an MPEG-2 (a standard for the generic coding of moving pictures and associated audio information) stream is input, the demultiplexing module demultiplexes it into video and audio signals.

The video decoding module is configured to process the demultiplexed video signal, including decoding and scaling processing.

The image synthesis module, such as an image synthesizer, is configured to mix the GUI signals generated by the graphics generator according to the user input or itself with the video images after the scaling processing to generate displayable image signals.

The frame rate conversion module is configured to convert the frame rate of an input video. For example, the input frame rate 60 Hz video is converted to a frame rate 120 Hz or 240 Hz. The format is usually implemented by a frame interpolation method.

The display format module is configured to convert a signal output from the frame rate conversion module to a signal conforming to a display format of the display. For example, it performs format conversion on a signal output from the frame rate conversion module to output an RGB data signal.

The display 275 is configured to receive image signal input from the video processor 270, and display video content, images, and menu operation interfaces. The displayed video content may come from the video content in the broadcast signal received by the tuner 210, or from the video content input by the communicator 220 or the external device interface 240. The display 275 simultaneously displays a user operation interface UI generated in the display device 200 and configured to control the display device 200.

The display 275 may include a display screen module for presenting an image and a drive module for driving image display. Alternatively, if the display 275 is a projection display, it may further include a projection device and a projection screen.

The audio processor 280 is configured to receive external audio signals, perform decompression and decoding according to the standard encoding and decoding protocol of the input signal, and implement audio data processing such as noise reduction, digital-to-analog conversion, and amplification processing to obtain the audio signal that can be played in a speaker 286.

In some examples, the audio processor 280 may support various audio formats, for example, MPEG-2, MPEG-4, advanced audio coding (AAC), high efficiency AAC (HE-AAC) and other formats.

An audio output interface 285 is configured to receive audio signal output from the audio processor 280 under the control of the controller 250. The audio output interface 285 may include the speaker 286, or an external audio output terminal 287 for outputting to an acoustic generating device, such as a headset output terminal.

In some other exemplary embodiments, the video processor 270 may include one or more chips. The audio processor 280 may also include one or more chips.

And, in some other exemplary embodiments, the video processor 270 and the audio processor 280 may be individual chips or integrated into one or more chips together with the controller 250.

The power supply 290 is configured to provide power supply support for the display device 200 with power input from an external power supply under the control of the controller 250. The power supply source 290 may be a built-in power supply circuit installed inside the display device 200 or a power supply installed outside the display device 200.

The embodiments of the present disclosure are applied to the page display of the display device. When a user updates a first presentation file in the presentation page stored in a local database of the display device to a second presentation file, the display device needs to refresh the presentation page on the screen to display the updated second presentation file, wherein the second presentation file has the same URL as the first presentation file, and the URL is configured to indicate where the presentation file is stored in the display device. The implementations for the above include: after the browser determines that the first presentation file is updated to the second presentation file, a update tag is generated; the browser generates a tagged URL according to the above URL and the update tag; and the browser then gets the second presentation file from the local database according to the tagged URL and loads the second presentation file into the refreshed presentation page.

So, when the storage position of the presentation file does not change before and after the update, a new update tag corresponding to a new presentation file is generated and further used to tag the URL of the new presentation file so that the browser can read resources from the local database of the display device rather than from a browser cache according to the tagged URL. That is, the updated file can be displayed without having to restart the browser. The operation process is simple and convenient, and the user experience is improved.

The following briefly describes the process in which the display device in an embodiment displays files in a web page form through a browser.

In some embodiments, the display device has a function of displaying files in the shopping mall mode. In this scenario, a user can manually update the presentation files by operating the display device.

In some embodiments, the presentation files may be an Epos, that is, an electronic sticker, which is an image containing sale information and displayed by the display device in a store or other environment. The following is a detailed description of the Epos.

The EPOS is a browser-based Web application and is equivalent to a page of a Web page in some sense. The page is designed and developed based on HTML5, JavaScript and CSS technics. HTML5 is configured to realize page display effect layout, CSS controls the style of page elements, and JavaScript can dynamically modify the page display effect and style. When an EPOS application starts, that is, when the page loads, it first parses the HTML5, JavaScript, and CSS languages, and then the browser displays the parsed results on the page. The URL of EPOS image resources is dynamically set using the JavaScript which is added to the HTML5 in form of an external file. When the browser is refreshed, the page will reload the JavaScript file, that is, it will reparse its content. The URL of the EPOS image resources can be updated in the JavaScript based on whether an update message is sent from a system UI or not. If an update message is sent during refresh, the new URL is used; and if no update message is sent during refresh, the URL remains unchanged.

In some embodiments, the display device may display the presentation files in web page form through a browser technology (such as the functions supported by the browser module in the display device memory in FIG. 1C), wherein the presentation files can be the locally-loaded images.

The browser here has a cache mechanism: usually the browser will copy corresponding web resources such as HTML pages, images or text of a requested Uniform Resource Locator (URL) and store their copies in the browser cache; when a request containing a same URL address is sent to the browser again, the browser directly obtains the copies from its cache to respond to this request to speed up resource loading and display.

For example, if a user visits a web page through the URL address for a first time, the browser will download the web page according to the URL address, and meanwhile the browser will cache a copy of the web page that the user has visited. When the user visits the URL address again, if the content of the web page is not updated, it will not download the web page again, but directly load the copy of the web page in the cache, thus speeding up the loading of the web page.

However, a storage space of the display device is limited. Usually, after exiting the browser or turning off the TV, the browser is set to empty the copied resources in the cache to increase the storage space of the display device and improve the running performance of the display device. After starting the browser or turning on the TV again, the browser will request the web resources again and display them as a web page.

Figure 2:
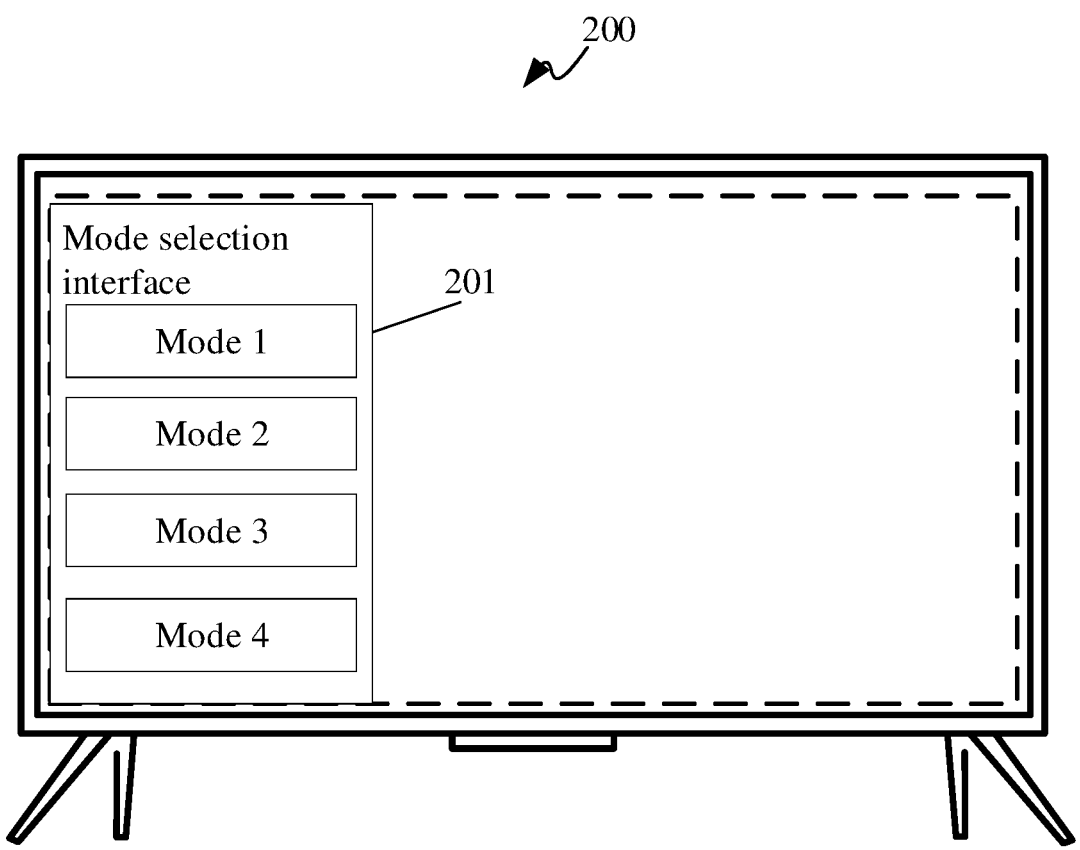
FIG. 2 illustrates a functional presentation interface displayed on a display of a display device.
Figure 3:
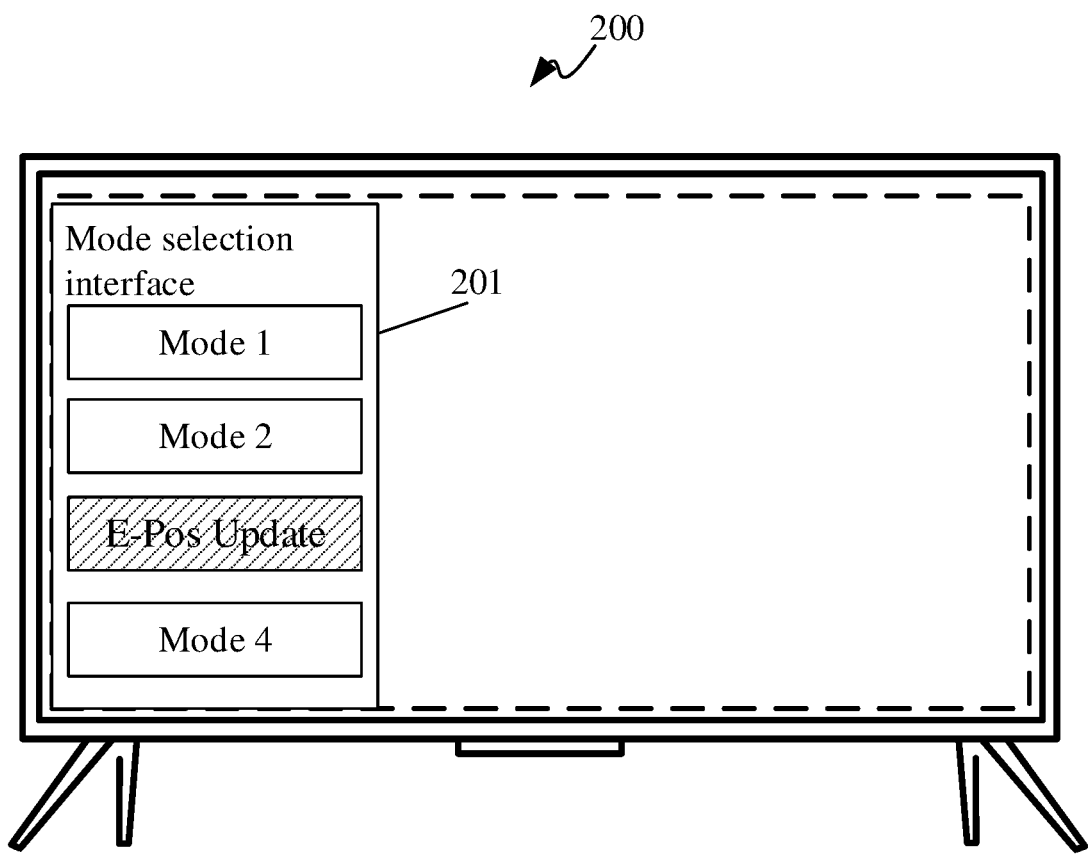
FIG. 3 illustrates a functional presentation interface displayed on a display of a display device.
Figure 4:
FIG. 4 illustrates a specific display content of a selected function on a display of a display device.

In some examples, as shown in FIG. 2, the user starts the display device through the keys of the controller or the display device, then controls the display device to enter into a mode selection interface, and selects a shopping mall mode from the mode selection interface of the TV. For example, the shopping mall mode is named "E-Pos Update" mode. As shown in FIG. 3, after the TV enters into the shopping mall mode, the display presents the currently playing TV content in full screen, such as the video on demand as shown in FIG. 4. The upper right corner of the display displays an image containing model and price information of the display device, and the image is overlaid on the TV content. For example, the content in the image is: the model is AA, the current promotion price is 4,999 RMB, and the original retail price is 5,499 RMB.

In the above example, the user operates the control device to open an image application program installed in the display device, and then displays customers an image containing the model and price information of the display device on its display through the image application program. The image application program displays through a browser and displays the images in web page form. The specific display process is as follows: the browser receives a request of the URL address related to the image to be displayed; the browser reads the image from local display device according to the URL address of the image carried in the request; and the browser decodes the read image, and displays the decoded image on the display page, and meanwhile stores the decoded image in the browser cache.

In some embodiments, the model and price information of the display device will change with the name and the preferential activities of the mall. At this time, the content of the images displayed to customers through the image application program need to be updated. To facilitate users to update the images, the images before and after the update are usually stored in the same location on a local storage area (for example, a local disk) of the display device. The URL addresses and image names of the images before and after the update are the same, that is, the images before the update are directly overlaid by the images after the update.

For example, if the price of a TV changes, the specific process of updating includes: the user first inserts a USB disk containing the image of the price change into a TV's Universal Serial Bus (USB) interface, and then selects an image update menu option by operating the control device while the image application program is running. The TV will copy the image with the price change to the storage location of the image with the original price, so that the image with the price change overlays the image with the original price; finally after the user completes the operation, the image application program needs to display the updated image through the presentation page. The URL address and image name of the image with the price change are the same as those of the image with the original price here.

However, in the above process, the image application program actually still displays the image with the original price, rather than the image with the price change. This is because: the URL address contained in the request sent from the presentation page to the browser is unchanged, and the browser will still obtain from its cache the decoded image corresponding to the URL address instead of obtaining the image with the price change from the local disk of the display device. Therefore, the user usually need to exit the image application program and restart the image application program to display the image with the price change.

Therefore, an embodiment of the present disclosure provides a display method after page updating, in order to implement real-time display of an update file on a presentation page. Specifically: after a display device enters into a shopping mall mode, the presentation file used in the presentation page is updated. At this time, the updated presentation file cannot be displayed on a user interface of the display device, but is only updated in a background of the display device. After the presentation file in the background of the display device is updated, the display device sends an update message to a browser installed on the display device to make the browser confirm the update of the presentation file in a local disk. After that, the browser refreshes the presentation page and modifies a URL address of the presentation file that needs to be loaded in the presentation page. The browser analyzes the modified URL address so that the updated presentation file can be obtained from the local disk for display. In this way, the URL address contained in a request sent from the presentation page to the browser changes, and the browser reprocesses the request, causing the display device to load and display the updated presentation file based on the changed URL address.

Figure 5:
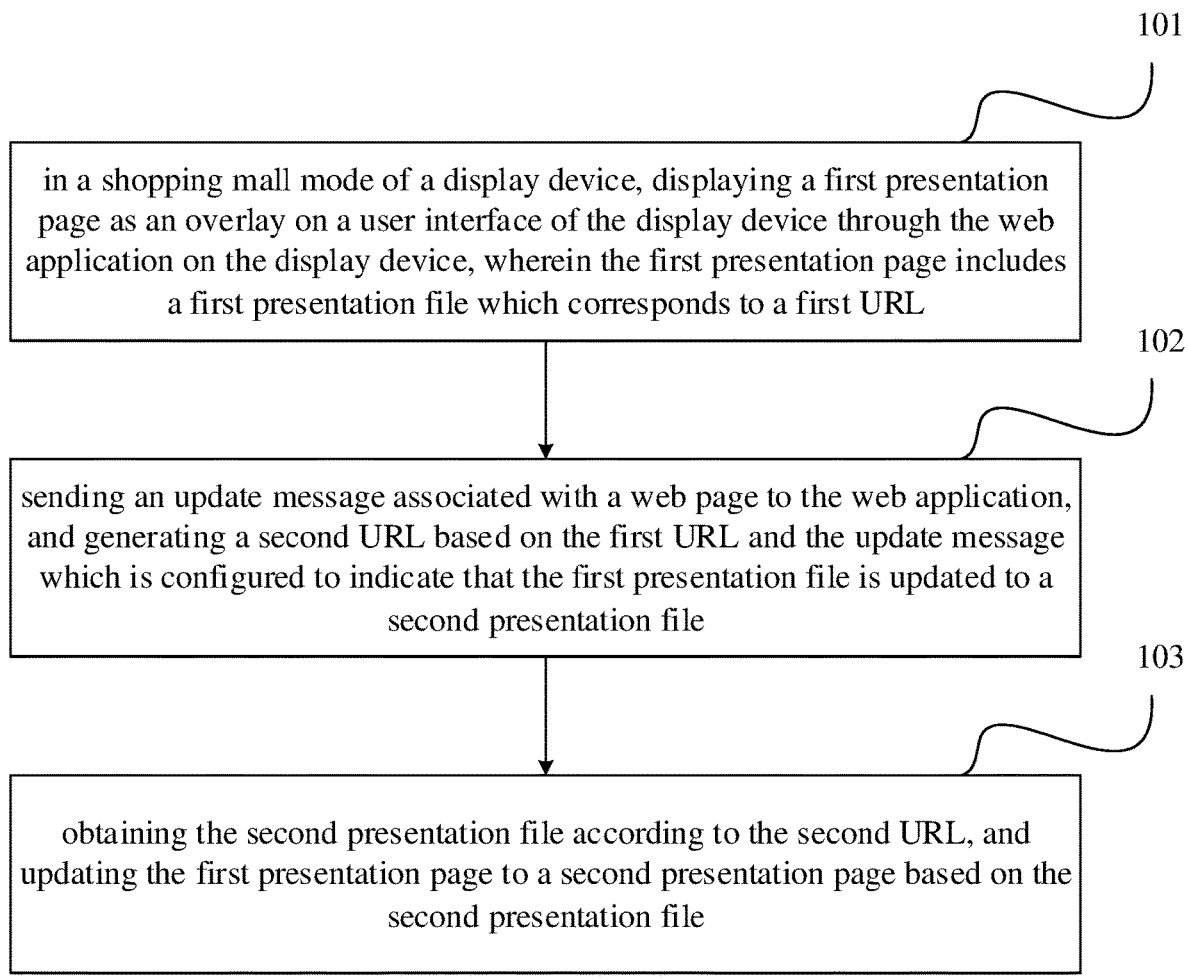
FIG. 5 is a flow diagram of a page updating method according to an embodiment of the present disclosure.

In some embodiments, as shown in FIG. 5, the display method after page updating according to the embodiments of the present disclosure includes, taking TV as the display device example, the following steps.

Step 101, in the shopping mall mode of the TV, displaying a first presentation page overlaid on a user interface of the TV by a web application running on the TV, wherein the first presentation page includes a first presentation file which corresponds to a first URL.

In some embodiments, a user needs to update the first presentation file in the shopping mall mode. As described above, the user can insert a USB disk containing images with the price change into a USB interface of the TV for real-time update, or can also select a file from a TV's local pre-stored image library to replace the first presentation file by operating a control device.

Step 102, sending an update message associated with the first presentation page to the web application, and generating a second URL based on the first URL and the update message which is used to indicate that the first presentation file is updated to a second presentation file.

Here, what is displayed on the first presentation page is still the first presentation file.

Step 103, obtaining the second presentation file according to the second URL, and updating the first presentation page to a second presentation page based on the second presentation file.

The embodiments of the present disclosure are applied to the page update of the display device. In the above embodiments, when the URL (that is, the storage position) of the presentation file does not change before and after the update, an update tag corresponding to the updated presentation file is generated and further used to tag the URL of the updated presentation file so that the browser can read resources from a local database of the display device rather than from a browser cache according to the tagged URL. That is, the updated file can be displayed without having to restart the browser. The operation process is simple and convenient, and the user experience is improved.

Alternatively, in the above step 102, the update message about the web page is sent to the web application, including:

an update system process sends to the web application an update message associated with the web page display and causes the web application to obtain an update tag based on the update message, wherein the update tag is generated by the update system process according to the second presentation file. The browser receives the update message sent by the update system process, wherein the update message is configured to indicate that the first presentation file is updated to the second presentation file.

In the specific implementation process, after the user updates the presentation file stored in the local database, the browser detects the update of the presentation file and can directly monitor the local database for the browser. In order to reduce the pressure on the browser, the embodiment of the present disclosure uses the update system process to monitor the local database. After listening to the user's update event, the update system process sends the update message to the browser, so that the browser determines that the presentation file in the local database has changed.

The update tag in the embodiment of the present disclosure may be a tag corresponding to the second presentation file and generated according to the second presentation file. For example, if the second presentation file is a piece of text, several words may be extracted from the text to form a character string serving as the update tag for the second presentation file. Alternatively, the update tag may also be a tag formed according to the update action from the first presentation file to the second presentation file. For example, the update tag is a generated random number, and the random number may be represented by Mark=Math.Random( ). When the presentation file is updated once, one corresponding random number is generated and stored in the local database. The random number can be generated by the browser, that is, the browser generates a random number upon receiving an update message.

In order to reduce the pressure on the browser, in some embodiments of the present disclosure, the random number is generated by the update system process, that is, after the update system process detects that the presentation file has changed, it generates a random number and stores it into the local database while sending an update message to the browser. After receiving the update message, the browser obtains the random number from the local database.

The above presentation file may be a document file, a program file, or an image file. The presentation page of the embodiment of the present disclosure may include a presentation file, that is, the presentation page only needs to read a file in one storage location in the local database; the presentation page may also include a plurality of presentation files, wherein the plurality of presentation files are stored in different storage locations in the local database. It should be noted that the storage location and file name of the presentation file before and after the update are kept unchanged.

These two scenarios are described below.

Scenario 1: if the presentation page includes one presentation file, the update message is the first update message.

In the above step 102, the update message associated with the web page display is sent to the web application, and generation of the second URL based on the first URL and the update message including: the first update message associated with the web page display is sent to the web application, and the browser obtains the first URL of the first presentation file from the presentation page according to the first update message; and the browser generates the second URL according to the first URL and the update tag.

Specifically, if there is only one presentation file, that is, there is only one storage location of the presentation file, the update system process sends the first update message to the browser, wherein the first update message may not include the URL of the presentation file. The browser can obtain the first URL of the first presentation file from the original presentation page.

The content contained in the first URL will be discussed below.

Example 1, the first URL may include a directory of the first presentation file and an identifier of the first presentation file. In one implementation, the directory of a file may be a directory path or a folder path of the file, and/or the identifier of a file may be a file name of the file including extension. For example, the directory of the first presentation file is "ftp://ste.org", the identifier of the first presentation file is "filea.png", and the first URL of the first presentation file is "ftp://ste.org"/filea.png".

Example 2: the first URL may include a directory of the first presentation file, an identifier of the first presentation file, and an update tag corresponding to the first presentation file. Specifically, the update tag of the first presentation file is added behind the identifier of the first presentation file, and the update tag and the identifier are separated with a symbol. For example, the directory of the first presentation file is "ftp://ste.org", and the identifier of the first presentation file is "filea.png". The update tag generated by the update system process for the first presentation file is 1356, and the first URL of the first presentation file is "ftp://ste.org/filea.png?1356". That is, the identifier and the update tag are separated with a question mark "T".

After the browser detects that the first presentation file is updated to the second presentation file, it obtains the update tag of the second presentation file from the local database according to the first update message. Meanwhile, the browser obtains the first URL of the first presentation file from the presentation page. After that, the browser generates the second URL according to the first URL and the update tag of the second presentation file.

Making further reference to the above Example 1, if the update tag of the second presentation file is 3518, since the save location and the name of the second presentation file are unchanged after the first presentation file is updated to the second presentation file, the directory of the second presentation file is the same as that of the first presentation file, which is still "ftp://ste.org", and the identifier of the second presentation file is the same as that of the first presentation file, which is still "filea.png". Since the update tag of the second presentation file is 3518, the update tag of the second presentation file is added to the first URL, and the obtained second URL of the second presentation file is "ftp://ste.org/filea. png?3518".

Following the above Example 2, if the update tag of the second presentation file is 3518, since the save location and the name of the second presentation file are maintained unchanged after the first presentation file is updated to the second presentation file, the directory of the second presentation file is the same as that of the first presentation file, which is still "ftp://ste.org", and the identifier of the second presentation file is the same as that of the first presentation file, which is still "filea.png". Since the update tag of the second presentation file is 3518, the update tag in the first URL is replaced with 3518, and the second URL of the second presentation file is "ftp://ste.org/filea. png?3518".

In this way, when the browser updates the presentation page, it will find that the URL of the presentation file has changed. So it will read the presentation file from the local database again instead of from the browser cache so as to display the updated presentation file on the TV presentation page.

Scenario 2: if the presentation page includes a plurality of presentation files, the update message is a second update message, and the second update message includes an identifier of the first presentation file.

An update message associated with the web page display is sent to the web application, and generation of the second URL based on the first URL and the update message including:

the second update message associated with the web page display is sent to the web application, and the browser obtains the first URL of the first presentation file from the presentation page according to the identifier of the first presentation file in the second update message; and the browser generates the second URL according to the first URL and the update tag.

Alternatively, when the presentation page includes a plurality of presentation files and the save locations of the presentation files are different, that is, the directories of the presentation files are different, the update message sent by the update system process to the browser is the second update message. The second update message includes the identifier of the first presentation file, which is used to inform the browser that the updated file is the first presentation file. The browser obtains the update tag of the second presentation file from local storage according to the received second update message, meanwhile obtains the first URL from the presentation page according to the identifier of the first presentation file, and then generates the second URL of the second presentation file according to the first URL and the update tag of the second presentation file. The form of the second URL is similar to that of the first case, and will omit herein.

In addition, for the presentation files that are not updated in the presentation page, the embodiment of the present disclosure still obtains them from the cache of the browser, thereby improving the loading efficiency of the presentation page. That is, for the presentation files that are not updated, after the browser determines that the first presentation file in the presentation page is updated to the second presentation file, the second update message further causes the following procedures:

the browser obtains the third URL of the third presentation file from the presentation page; the third presentation file is a remaining presentation file other than the first presentation file among the plurality of presentation files;

the browser obtains the third presentation file from the browser cache according to the third URL; and the browser loads the third presentation file into the updated presentation page.

In order to understand the present disclosure more clearly, the above process will be described in detail with reference to following specific embodiments.

Figure 6:
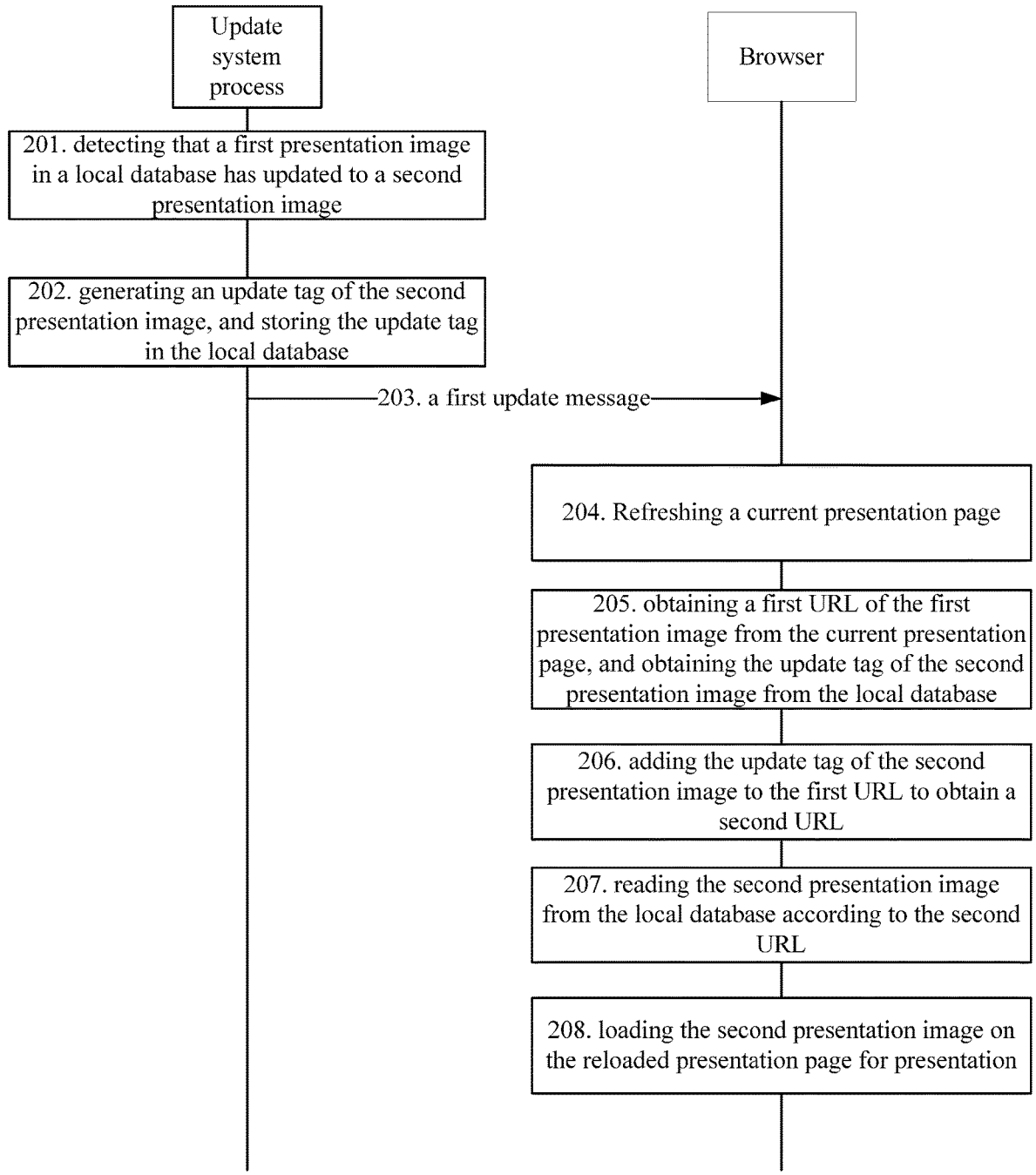
FIG. 6 is a flow diagram of a page updating method according to Embodiment 1 of the present disclosure.

A first embodiment where only one presentation image is included in the display page when updating the presentation file is described. The specific steps are as shown in FIG. 6 and include the following process:

Step 201: the update system process detects that the first presentation image in the local database has updated to the second presentation image;

Step 202: the update system process generates an update tag of the second presentation image, that is, generating a random number denoted by Mark, and storing the update tag in the local database;

Step 203: the update system process sends the first update message to the browser;

Step 204: the browser refreshes the current presentation page;

Step 205: the browser obtains the first URL of the first presentation image from the current presentation page, and obtains the update tag of the second presentation image from the local database;

Step 206: the browser adds the update tag of the second presentation image to the first URL to obtain a tagged URL, that is, the second URL;

Step 207: the browser reads the second presentation image from the local database according to the second URL;

Step 208: the browser loads the second presentation image on the reloaded presentation page for presentation.

Figure 7:
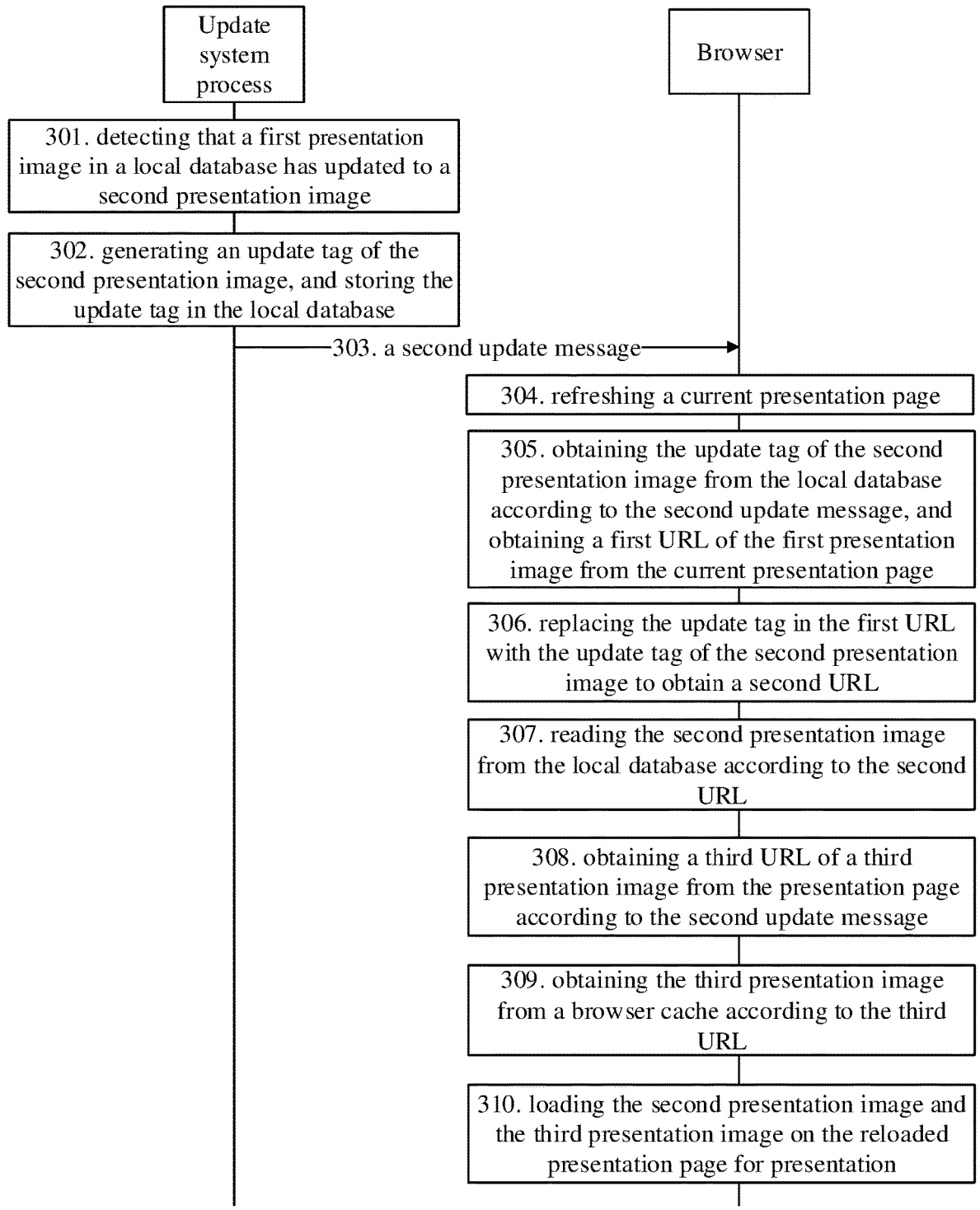
FIG. 7 is a flow diagram of a page updating method according to Embodiment 2 of the present disclosure.

A second embodiment where a plurality of presentation images are included in the presentation page when updating the presentation file in the local disk will be discussed, wherein a first presentation image is updated to a second presentation image, while the remaining presentation images are kept unchanged. The specific steps are shown in FIG. 7 and include the following steps:

Step 301: the update system process detects that the first presentation image in the local database has been updated to the second presentation image;

Step 302: the update system process generates an update tag of the second presentation image, that is, generating a random number denoted by Mark, and storing the update tag in the local database;

Step 303: the update system process sends the second update message to the browser, wherein the second update message includes an identifier of the first presentation image;

Step 304: the browser refreshes the current presentation page; Step 305: the browser obtains the update tag of the second presentation image from the local database according to the second update message, and obtains the first URL of the first presentation image from the current presentation page;

Step 306: the browser replaces the update tag in the first URL with the update tag of the second presentation image to obtain the second URL;

Step 307: the browser reads the second presentation image from the local database according to the second URL;

Step 308: the browser obtains the third URL of the third presentation image from the presentation page according to the second update message, wherein the third presentation image is a remaining presentation image in the presentation page other than the first presentation image;

Step 309: the browser obtains the third presentation image from the browser cache according to the third URL;

Step 310: the browser loads the second presentation image and the third presentation image on the reloaded presentation page for presentation.

Based on the above method embodiments, the method according to the embodiment of the present disclosure can be correspondingly executed by the display device in FIG. 1C.

The controller 250 is configured to read the programs in the memory 260 to execute:

in the shopping mall mode of the display device, displaying a first presentation page as an overlay on a user interface of the display device by a web application running on the display device, wherein the first presentation page includes a first presentation file, and the first presentation file corresponds to the first URL;

sending an update message associated with the web page display to the web application, and generating a second URL based on the first URL and the update message, wherein the update message is configured to indicate that the first presentation file is updated to the second presentation file;

obtaining the second presentation file according to the second URL and updating the first presentation page to the second presentation page based on the second presentation file.

Further, the controller 250 is configured to send an update message associated with the web page display to the web application by performing the following process:

the update message is sent to the web application by the update system process and the web application is caused to obtain an update tag based on the update message, wherein the update tag is generated by the update system process according to the second presentation file.

Further, the controller 250 is configured to send an update message associated with the web page display to the web application, and generate the second URL based on the first URL and the update message by performing the following process:

the update message associated with the web page display is sent to the web application, so that the browser obtains the first URL of the first presentation file from the first presentation page according to the update message, and generates the second URL based on the first URL and the update tag.

Alternatively, the first presentation page further includes a third presentation file, and the update message contains an identifier of the first presentation file.

The controller is configured to send an update message associated with the web page display to the web application, and to generate the second URL based on the first URL and the update message by the following process:

the update message associated with the web page display is sent to the web application, so that the web application obtains the first URL of the first presentation file from the first presentation page according to the identifier of the first presentation file in the update message, and generates the second URL according to the first URL and the update tag;

the web application further obtains a third URL of a third presentation file from the first presentation page, and obtains the third presentation file from the cache according to the third URL; and the display device loads and displays the third presentation file.

Alternatively, the controller is configured to generate the second URL based on the first URL and the update message by performing the following process:

the update tag is added to the first URL according to the update message to generate the second URL.

Alternatively, the controller is configured to generate the second URL based on the first URL and the update message by performing the following process:

the update tag replaces the original update tag in the first URL according to the update message to generate the second URL.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described, and may be varied in many ways. Such variations are not to be regarded as a departure from the present disclosure, and all such modifications are intended to be included within the scope of the present disclosure.

The invention claimed is:

1. A method for updating a page, comprising:
   controlling, by a controller of a display device, the display device to enter into a mode selection interface;
   in response to a selection operation for selecting a shopping mall mode in the mode selection interface, starting, by the display device, the shopping mall mode;
   in the shopping mall mode:
      opening a web application on the display device, the web application comprising a browser,
      receiving a request of a first uniform resource locator (URL) associated with a first presentation file through the browser,
      reading the first presentation file from a local storage of the display device through the browser according to the first URL,
      decoding the first presentation file through the browser, and
      displaying, by the web application on the display device, the decoded first presentation file in a first presentation page as an overlay on a user interface of the display device;
   in response to the first presentation file being updated to a second presentation file, generating, by an update system process on the display device, an update tag according to the second presentation file;
   sending, by the update system process on the display device, an update message associated with a web page presentation to the web application on the display device, wherein the update message indicates that the first presentation file is updated to the second presentation file;
   obtaining, by the web application on the display device, the update tag in response to receiving the update message;
   generating, by the web application on the display device, a second URL corresponding to the second presentation file based on the first URL and the update tag;
   obtaining, from a local database of the display device, the second presentation file according to the second URL; and
   updating, by the display device, the first presentation page to a second presentation page based on the second presentation file.

2. The method according to claim 1, wherein the generating the second URL based on the first URL and the update message comprises:
   obtaining, by the web application on the display device, the first URL of the first presentation file from the first presentation page according to the update message; and generating, by the web application on the display device, the second URL according to the first URL and the update tag.

3. The method according to claim 2, wherein the generating the second URL based on the first URL and the update message, comprising:
adding the update tag to the first URL according to the update message to generate the second URL.

4. The method according to claim 2, wherein the generating the second URL based on the first URL and the update message, comprising:
replacing an original update tag in the first URL with the update tag according to the update message to generate the second URL.

5. The method according to claim 1, wherein:
the first presentation page further comprises a third presentation file;
the update message contains an identifier of the first presentation file;
the generating the second URL based on the first URL and the update message comprises:
obtaining, by the web application on the display device, the first URL of the first presentation file from the first presentation page according to the identifier of the first presentation file in the update message, and
generating, by the web application on the display device, the second URL according to the first URL and the update tag; and
the method further comprises:
obtaining, by the web application on the display device, a third URL of the third presentation file from the first presentation page by the web application,
obtaining, by the web application on the display device, the third presentation file from a cache according to the third URL, and
loading and displaying, by the display device, the third presentation file.

6. The method according to claim 5, wherein the generating the second URL based on the first URL and the update message, comprising:
adding the update tag to the first URL according to the update message to generate the second URL.

7. The method according to claim 5, wherein the generating the second URL based on the first URL and the update message, comprising:
replacing an original update tag in the first URL with the update tag according to the update message to generate the second URL.

8. A display device, comprising:
a display configured to display an image;
a memory configured to store programs and data associated with the display; and
a controller in communication with the display and the memory, wherein, when the controller executes the programs stored in the memory, the controller is configured to cause the display device to perform:
controlling the display device to enter into a mode selection interface;
in response to a selection operation for selecting a shopping mall mode in the mode selection interface, starting the shopping mall mode;
in the shopping mall mode:
opening a web application on the display device, the web application comprising a browser,
receiving a request of a first uniform resource locator (URL) associated with a first presentation file through the browser,
reading the first presentation file from a local storage of the display device through the browser according to the first URL,
decoding the first presentation file through the browser, and
displaying, by the web application on the display device, the decoded first presentation file in a first presentation page as an overlay on a user interface of the display device;
in response to the first presentation file being updated to a second presentation file, generating, by an update system process on the display device, an update tag according to the second presentation file;
sending, by the update system process on the display device, an update message associated with a web page presentation to the web application on the display device, wherein the update message indicates that the first presentation file is updated to the second presentation file;
obtaining, by the web application on the display device, the update tag in response to receiving the update message;
generating, by the web application on the display device, a second URL corresponding to the second presentation file based on the first URL and the update tag;
obtaining, from a local database of the display device, the second presentation file according to the second URL; and
updating the first presentation page to a second presentation page based on the second presentation file.

9. The display device according to claim 8, wherein the controller is configured to perform generating the second URL based on the first URL and the update message by:
obtaining the first URL of the first presentation file from the first presentation page according to the update message; and
generating the second URL according to the first URL and the update tag.

10. The display device according to claim 9, wherein the controller is configured to perform generating the second URL based on the first URL and the update message by:
adding the update tag to the first URL according to the update message to generate the second URL.

11. The display device according to claim 9, wherein the controller is configured to perform generating the second URL based on the first URL and the update message by:
replacing an original update tag in the first URL with the update tag according to the update message to generate the second URL.

12. The display device according to claim 8, wherein:
the first presentation page further comprises a third presentation file;
the update message comprises an identifier of the first presentation file;
the controller is configured to perform generating the second URL based on the first URL and the update message by:
obtaining the first URL of the first presentation file from the first presentation page according to the identifier of the first presentation file in the update message, and
generating the second URL according to the first URL and the update tag; and
when the controller executes the programs stored in the memory, the controller is further configured to cause the display device to perform:

obtaining a third URL of the third presentation file from the first presentation page by the web application, obtaining the third presentation file from a cache according to the third URL, and loading and displaying the third presentation file by the display device.

13. The display device according to claim 12, wherein the controller is configured to perform generating the second URL based on the first URL and the update message by:

adding the update tag to the first URL according to the update message to generate the second URL.

14. The display device according to claim 12, wherein the controller is configured to perform generating the second URL based on the first URL and the update message by:

replacing an original update tag in the first URL with the update tag according to the update message to generate the second URL.

* * * * *